(12) United States Patent
Feeney

(10) Patent No.: US 10,546,399 B2
(45) Date of Patent: Jan. 28, 2020

(54) PENCIL INK RENDER USING HIGH PRIORITY QUEUES

(71) Applicant: Microsoft Technology Licensing, LLC, Redmond, WA (US)

(72) Inventor: Nicholas DeFay Feeney, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 7 days.

(21) Appl. No.: 15/819,956

(22) Filed: Nov. 21, 2017

(65) Prior Publication Data

US 2019/0156528 A1  May 23, 2019

(51) Int. Cl.
*G06T 11/20* (2006.01)
*G06T 11/40* (2006.01)
*G06T 1/20* (2006.01)
*G06F 3/0354* (2013.01)

(52) U.S. Cl.
CPC .............. *G06T 11/203* (2013.01); *G06T 1/20* (2013.01); *G06T 11/40* (2013.01); *G06F 3/03545* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 9,383,840 B2 * | 7/2016 | Seto | G06F 3/041 |
| 9,384,523 B1 * | 7/2016 | Penner | G06F 9/48 |
| 9,529,463 B1 | 12/2016 | Ramani et al. | |
| 2008/0122843 A1 * | 5/2008 | Chung | G06F 9/30145 345/426 |
| 2016/0004375 A1 | 1/2016 | Xiong | |
| 2016/0188303 A1 * | 6/2016 | Rodrigues De Araujo | G06F 3/0488 715/762 |

FOREIGN PATENT DOCUMENTS

WO    2017165333 A1    9/2017

OTHER PUBLICATIONS

"International Search Report and Written Opinion Issued in PCT Application No. PCT/US2018/059918", dated Feb. 13, 2019, 11 Pages.

* cited by examiner

*Primary Examiner* — Xin Sheng
(74) *Attorney, Agent, or Firm* — Arent Fox LLP

(57) ABSTRACT

Examples described herein generally relate to rendering digital pencil ink on a display of a computer device. The computer device may render a frame via a graphics queue of a graphics processing unit (GPU). The computer device may fetch updated digital pencil ink input from an input buffer at a designated time before scanning at least a portion of the frame including the digital pencil ink. The computer device may determine a set of input stamps based on the updated digital pencil ink input, each input stamp being associated with stamp properties. A compute shader thread for each block within a portion of the frame may determine whether each of the input stamps intersects the block. At least one compute shader thread for each pixel of a respective block may determine a cumulative effect of each of the input stamps intersecting the respective block on the pixel based on the stamp properties.

20 Claims, 11 Drawing Sheets

PENCIL INK RENDER USING HIGH PRIORITY QUEUES

BACKGROUND

The present disclosure relates to a computer graphics system, and more particularly, to displaying updates to digital ink.

Digital ink allows a user to draw on a screen of a display device using a device such as a digitized pen. Typically, the input from the device generates a command from the CPU to update the screen to include the digital ink. The screen update is provided to a graphics processor (GPU) that renders the updated screen including the digital ink. The GPU typically queues the digital ink along with other updates to the screen and renders the ink when the screen is updated. Typical screen refresh rates are on the order of 30-90 Hz. A user may move a digital pen tip at high speeds (relative to the screen refresh rate) with rapid changes in direction. For example, a digital pen may provide position updates at 240 Hz. Due to the length of the rendering pipeline, there may be a delay of at least 50 ms between the time an input of digital ink is received to the time that the GPU is able to render the input. Accordingly, when drawing with digital ink, a user may notice a gap between the tip of the pen input and the rendered digital ink. The user may feel the experience of drawing with digital ink is less responsive than traditional ink. In the case of specialized digital ink having more detailed features such as pencil effects, the gap between the tip of the pen input and the rendered digital ink may reduce feedback to the user regarding the detailed features of the digital ink.

One solution to processing digital ink is to use customized processing hardware in the display device that processes the input and renders the digital ink. For example, the display device may detect the location of a pen and shade pixels using the customized processing hardware. While effective, this solution is customized to specific hardware and the customized processing hardware adds significant cost.

Thus, there is a need in the art for improvements in graphics processing for updating digital ink on display devices.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an example, a method of drawing digital pencil ink on a display may include rendering a frame via a graphics queue of a graphics processing unit (GPU). The method may include fetching updated digital pencil ink input from an input buffer at a designated time before scanning at least a portion of the frame including the digital pencil ink to the display, the digital pencil ink input including input locations and input properties associated with each input location. The method may include determining a set of input stamps based on the updated digital pencil ink input, each input stamp being associated with stamp properties. The method may include determining, using a compute shader thread for each block within a portion of the frame, whether each of the input stamps intersects the block. The method may include determining, using at least one compute shader thread for each pixel of a respective block, a cumulative effect of each of the input stamps intersecting the respective block on the pixel based on the stamp properties. The method may include outputting each pixel to the display based on the cumulative effect of each of the stamps.

In another example, a computer device for drawing digital pencil ink is provided. The computer device may include a memory storing one or more parameters or instructions for executing an operating system and one or more applications. The computer device may include a graphics processing unit (GPU) for rendering frames of the one or more applications for display on a display device coupled to the computer device, the GPU including a graphics queue and a priority queue. The computer device may include at least one processor coupled to the memory, and the GPU. The at least one processor may be configured to render a frame via the graphics queue of the GPU. The at least one processor may be configured to fetch updated digital pencil ink input from an input buffer at a designated time before scanning at least a portion of the frame including the digital pencil ink to the display, the digital pencil ink input including input locations and input properties associated with each input location. The at least one processor may be configured to determine a set of input stamps based on the updated digital pencil ink input, each input stamp being associated with stamp properties. The at least one processor may be configured to determine, using a compute shader thread for each block within a portion of the frame, whether each of the input stamps intersects the block. The at least one processor may be configured to determine, using at least one compute shader thread for each pixel of a respective block, a cumulative effect of each of the input stamps intersecting the respective block on the pixel based on the stamp properties. The at least one processor may be configured to output each pixel to the display based on the cumulative effect of each of the stamps.

In another example, a computer-readable medium includes code executable by one or more processors for drawing digital pencil ink on a display using a GPU in a computer device. The code may include code for rendering a frame via a graphics queue of the GPU. The code may include code for fetching updated digital pencil ink input from an input buffer at a designated time before scanning at least a portion of the frame including the digital pencil ink to the display, the digital pencil ink input including input locations and input properties associated with each input location. The code may include code for dispatching a first compute shader thread for each input location of the updated digital pencil ink input to determine a set of input stamps based on the updated digital pencil ink input, each input stamp being associated with stamp properties. The code may include code for dispatching a second compute shader thread group for each block within a portion of the frame to determine whether each of the input stamps intersects the block, each thread group including a thread for each input stamp. The code may include code for dispatching at least one third compute shader thread for each pixel of a respective intersected block to determine a cumulative effect of each of the input stamps intersecting the respective intersecting block on the pixel based on the stamp properties. The code may include code for outputting each pixel to the display based on the cumulative effect of each of the stamps.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
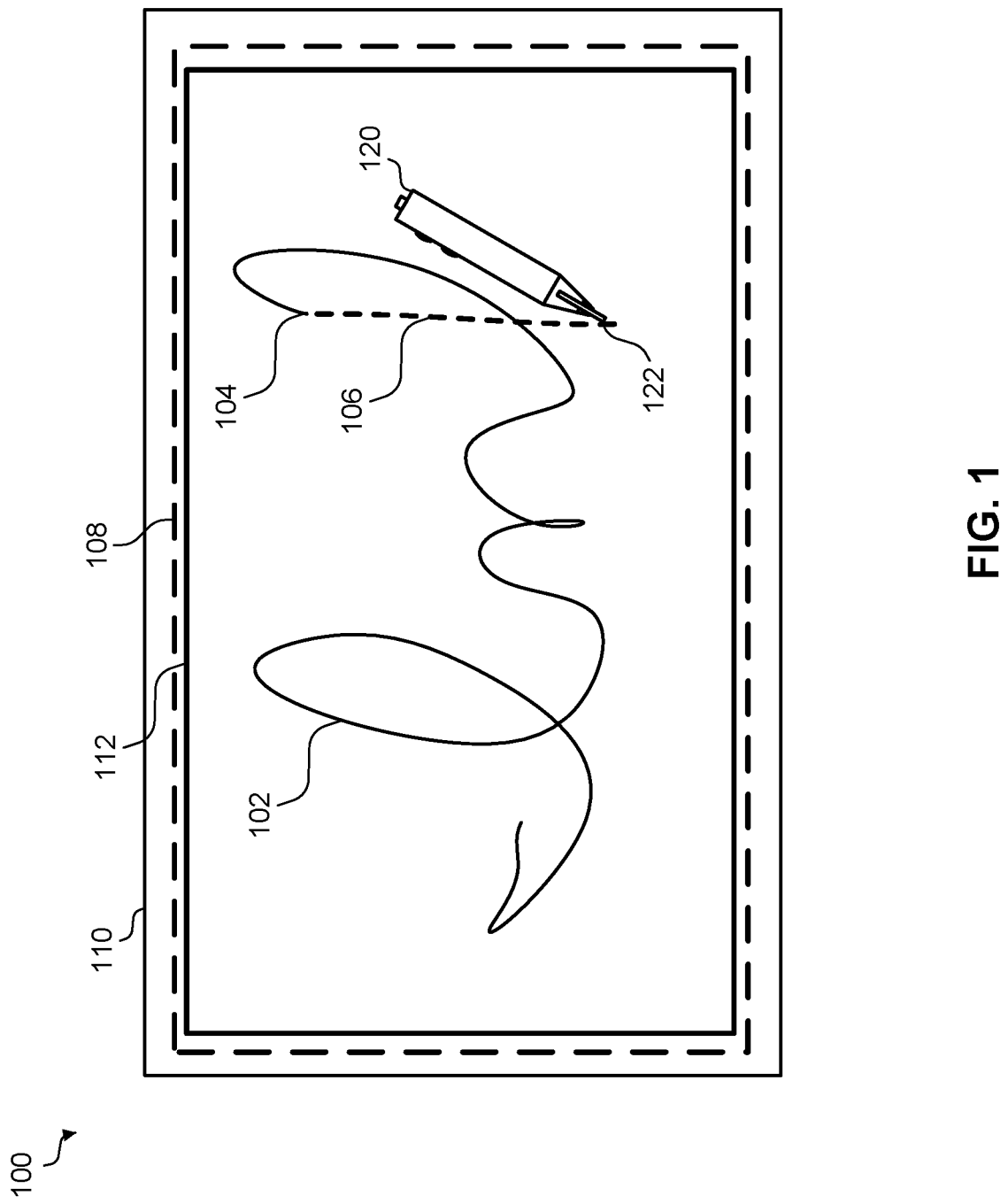
FIG. 1 is a diagram of drawing digital ink on a display using a digital pen and conventional techniques.

The present disclosure provides systems and methods for rendering digital pencil ink on a display with relatively low latency (as compared to current solutions). As used herein, the term digital ink includes any coloring of pixels on a display based on an indication by a user relative to the display. For example, digital ink may be drawn by a user using a digital pen, stylus, or finger. Digital pencil ink refers to digital ink intended to create a visual effect similar to drawing with a pencil. As discussed in further detail below, digital pencil ink may be rendered as a series of stamps, each stamp having properties based on how the input device is held and characteristics of a selected pencil.

In an implementation, for example, this disclosure provides systems and methods for rendering digital pencil ink on a screen using a priority queue to add the most up to date ink input to a rendered frame. The priority queue may be a queue for a compute shader. The compute shader may be a programmable shader stage that provides high-speed general purpose computing and takes advantage of the large numbers of parallel processors on the graphics processing unit (GPU). The compute shader may perform operations in a single stage and may have a priority queue that is separate from a graphics pipeline. A characteristic of the priority queue is that graphics processing work in the priority queue may be processed more quickly than graphics processing work in the graphics pipeline. Unlike custom processing hardware, the compute shader may be a non-customized component of a GPU on many computer devices. For example, such a compute shader may be found on computer devices including GPUs capable of running at least MICROSOFT Direct3D 10 ®. The systems and method use the priority queue and the compute shader to process and draw the most recent updates (e.g., at least with respect to position) to the digital pencil ink to a frame that is about to be displayed, while the traditional graphics pipeline is used to render previously received digital pencil ink in subsequent frames.

In an implementation, the input for the most recent digital pencil ink may be put on a relatively fast path (as compared to a path to the graphics pipeline) to update the high priority compute shader drawing. For example, the pen input may be provided directly to an ink function, bypassing an application and 2D compositor. The ink function may provide the command to the compute shader to draw the ink update as digital pencil ink using the compute shader. The command may be added to the priority queue of the compute shader. The timing for the digital pencil ink updates may be provided by a monitored fence that provides an indication with respect to a video synchronization (V-SYNC) corresponding to a deadline for presenting a next frame.

Various procedures may be used by the compute shader to add the digital pencil ink to a frame. Generally, the compute shader does not use triangles as in traditional graphics processing. In an example procedure, input into the ink function may be a series of input points on the display. In a first pass, the compute shader may determine stamp properties for each input point. In a second pass, a portion of the display may be divided into blocks, and the compute shader may determine which stamps intersect each block. In a third pass, the compute shader may determine for each pixel in the intersected blocks a weight of each stamp. The cumulative weight of the stamps may be used to determine how to display each pixel. Because a compute shader is programmable, additional techniques for drawing high quality ink may be developed as needed. The updated ink may be provided to the traditional rendering pipeline for display in frames subsequent to the frame when the updated ink is received.

Referring now to FIG. 1, an example computer system 100 includes a computer device 110 and a digital pen 120 (also referred to as a stylus). The computer device 110 may be, for example, any mobile or fixed computer device including but not limited to a desktop or laptop or tablet computer, a cellular telephone, a gaming device, a mixed reality or virtual reality device, a music device, a television, a navigation system, a camera, a personal digital assistant (PDA), a handheld device, any other computer device having wired and/or wireless connection capability with one or more other devices, or any other type of computerized device capable of receiving inputs from digital pen 120. The computer device 110 may include a display 112. The display 112 may be a digitized surface such as a touch screen that performs both output of images and receiving input from a user. The display 112 may include a digitizer 108 for detecting a location of an interaction between a user and the display 112. For example, the digitizer 108 may detect the location of a finger or the digital pen 120 on the display 112 or a point of contact or near point of contact between the digital pen 120 and the display 112. In some examples, the computer device 110 may detect the digital pen 120 hovering near the digitized surface and register a touch event upon an action such as clicking a button on the digital pen 120.

As illustrated in FIG. 1, the computer device 110 may allow a user to draw digital pencil ink 102 on the display 112. For example, FIG. 1 illustrates the word "Ink" being written on the display 112 in a continuous line. The display 112 may be periodically updated at a refresh rate (e.g., 30 Hz-90 Hz). The digital pen 120 and/or the digitizer 108 may provide updated position information at a higher rate (e.g., 240 Hz) than the refresh rate. A displayed portion of the digital pencil ink 102 may end at an end point 104 corresponding to a last update of the position used as an input into rendering an image for the display 112. Because the digital pen 120 may move relatively quickly, a segment 106 (represented as a dashed line) between the end point 104 and the pen tip 122 may not be included in the digital pencil ink 102 rendered to the image on display 112. Accordingly, when a user is writing with the digital pen 120, a gap corresponding to the segment 106 may appear between the digital pencil ink 102 and the pen tip 122.

Figure 2:
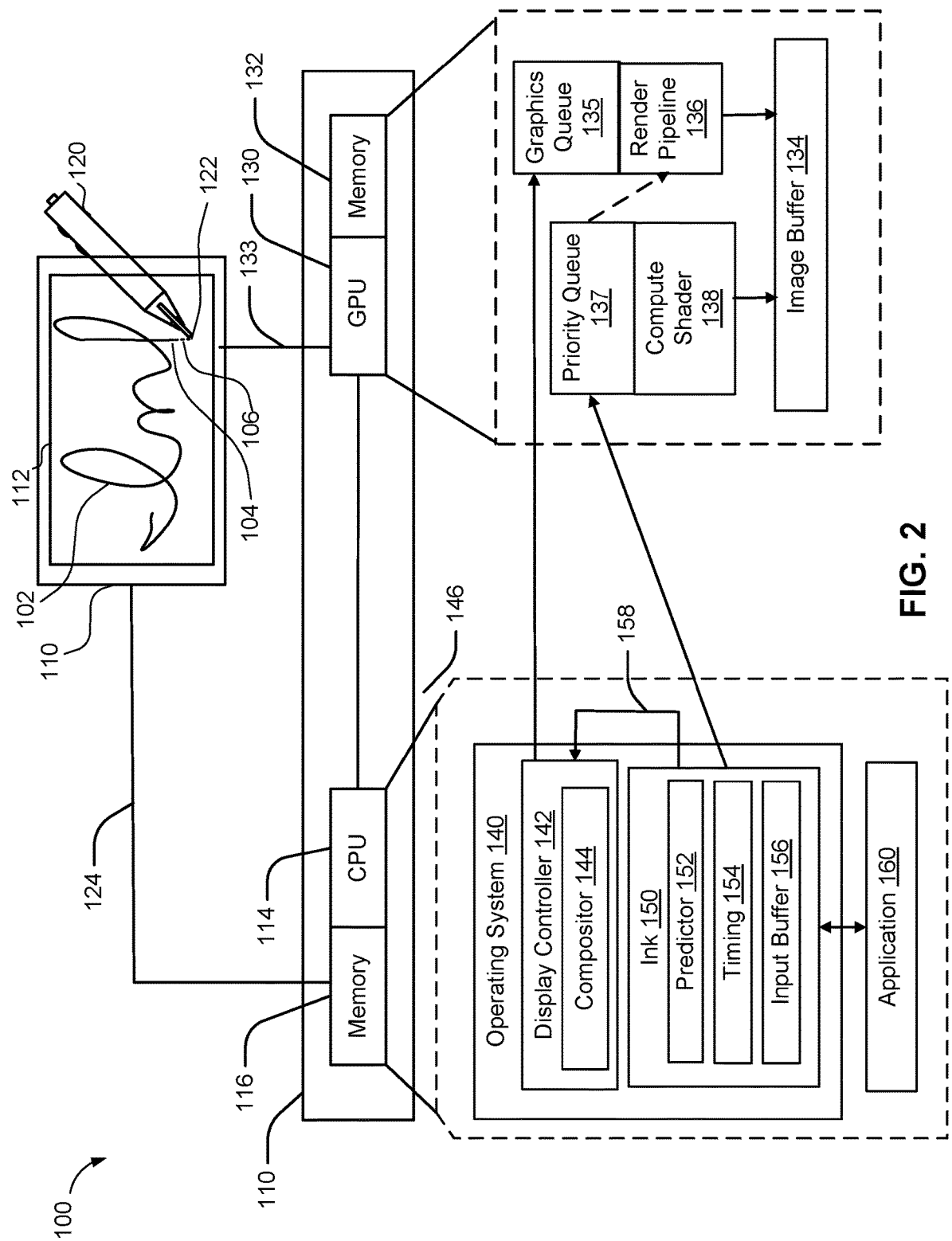
FIG. 2 is a schematic block diagram of an example system for drawing digital pencil ink on a display, in accordance with an implementation of the present disclosure.

Referring to FIG. 2, an example computer system 100 may include a computer device 110 that provides images for display on the display 112 using a graphics processing unit (GPU) 130 including a priority queue 137 for receiving position updates from digital pen 120 and a compute shader 138 for rendering the pen updates. The computer device 110 may also include a CPU 114 that executes instructions stored in memory 116. For example, the CPU 114 may execute an operating system 140 and one or more applications 160. The operating system 140 may control the GPU 130 and the use of the priority queue 137 and the compute shader 138 for drawing digital pencil ink in a manner that reduces latency between digital pencil ink input (e.g., from digital pen 120) and drawing of the digital pencil ink on the display 112, e.g., for reducing the gap (relative to current solutions) corresponding to the segment 106 may appear between the digital pencil ink 102 and the pen tip 122.

Computer device 110 may include a memory 116 and CPU 114 configured to control the operation of computer device 110. Memory 116 may be configured for storing data and/or computer-executable instructions defining and/or associated with an operating system 140 and/or application 160, and CPU 114 may execute operating system 140 and/or application 160. An example of memory 116 can include, but is not limited to, a type of memory usable by a computer, such as random access memory (RAM), read only memory (ROM), tapes, magnetic discs, optical discs, volatile memory, non-volatile memory, and any combination thereof. Memory 116 may store local versions of applications being executed by CPU 114.

The CPU 114 may include one or more processors for executing instructions. An example of CPU 114 can include, but is not limited to, any processor specially programmed as described herein, including a controller, microcontroller, application specific integrated circuit (ASIC), field programmable gate array (FPGA), system on chip (SoC), or other programmable logic or state machine. The CPU 114 may include other processing components such as an arithmetic logic unit (ALU), registers, and a control unit.

The operating system 140 may include instructions (such as application 160) stored in memory 116 and executable by the CPU 114. The operating system 140 may include a display controller 142 for controlling the GPU 130. For example, the display controller 142 may provide commands 146 to the GPU 130 to perform one or more specific graphics processing operations such as rendering source images or performing adjustments. The display controller 142 may include a compositor 144, in the form of a hardware and/or software component, configured to combine multiple sources of information to create a complete image for display. For example, in a 2D environment, the compositor 144 may determine in which windows various applications are to be rendered.

The GPU 130 may include one or more processors and specialized hardware for image processing. In an implementation, the GPU 130 may be integrated with a CPU 114 on a motherboard of the computer device or may be a discrete chip. The GPU 130 may include a dedicated memory 132. The GPU 130 may be connected to the display 112 via a display interface 133. The GPU 130 may periodically scan out an image from an image buffer 134 to the display 112 via the display interface 133 according to a refresh rate of the display 112. The GPU 130 may include a graphics queue 135, a render pipeline 136, a priority queue 137, and a compute shader 138. The graphics queue 135 may receive commands from the display controller 142 for rendering an image. The graphics queue 135 may generally provide the commands to the render pipeline 136. The render pipeline 136 may perform multiple stages of image processing. For example, the render pipeline 136 may include an input-assembler stage, vertex shader stage, hull shader stage, tessellator stage, domain shader stage, geometry shader stage, stream output stage, rasterizer stage, pixel-shader stage, and output merger stage.

The priority queue 137 may receive commands from the ink function 150 and/or display controller 142. Generally, the priority queue 137 may provide commands to the compute shader 138. The compute shader 138 may operate as a single processing stage, which may allow prioritization of commands in the priority queue 137 over existing commands (e.g., from the graphics queue). Accordingly, passing commands to the compute shader 138 via the priority queue 137 may allow execution of the commands in a fast and predictable manner. In an implementation, the priority queue 137 may also provide commands to the render pipeline 136. For example, the render pipeline hardware may allow interruption of ongoing commands at certain stages of the render pipeline 136 or may include additional resources for processing high-priority commands. Accordingly, the use of the priority queue 137 and/or compute shader 138 may allow the relatively simple operation of drawing ink to be performed more quickly than if the same operation is performed by multiple stages of the render pipeline 136. For example, the compute shader 138 may draw updated ink in less time than the render pipeline 136 takes to render the entire frame. Therefore, when using the priority queue and/or compute shader 138, the time for obtaining input for the ink update may be moved closer to the time that the ink is displayed.

In an example, display interface 133 can be communicatively coupled with the GPU 130 and/or memory 132 for communicating with the display 112. A display interface, as referred to herein, may also include various types of ports, including high definition multimedia interface (HDMI) ports, display serial interface (DSI) ports, mobile industry processor interface (MIPI) DSI ports, universal serial bus (USB) ports, Firewire ports, or other embedded or external wired or wireless display ports that can allow communications between computer device 110 and display 112.

The operating system 140 may include an ink function 150. The ink function 150 may provide a fast path for ink input to reach the priority queue 137. For example, the fast path may provide commands for drawing the ink input to the priority queue rather than a traditional path of providing ink input to an application to process before generating commands for rendering the ink. Accordingly, the fast path may bypass the application 160. The digital pen 120 and/or digitizer 108 may provide input information (e.g., pen coordinates and properties) to an input buffer 156 in memory 116 via a wired or wireless connection 124. When woken up for input, the ink function 150 may access the input buffer 156 to obtain the input information. The ink function 150 may determine whether the input information is ink input or another type of input (e.g., a button press), for example, based on whether the input is in a drawing area or whether an inking mode is selected. The ink function 150 may generate commands for the GPU 130 to draw digital pencil ink based on the ink input and send the commands to the priority queue 137. For example, the ink function 150 may generate dispatch commands for the compute shader 138 to draw digital pencil ink 102 based on the ink input. The ink function 150 may provide ink input to other components that utilize the ink input such as the display controller 142 and the application 160. For example, the display controller 142 may control the GPU 130 to render the ink input in a subsequent frame (relative to a frame currently being presented) using the graphics queue 135.

The ink function 150 may also control timing of obtaining ink input and generating commands to draw the digital pencil ink. In order to minimize latency between the ink input and drawing the digital pencil ink on the display 112, the ink function 150 may attempt to obtain the ink input as late as possible before processing the ink input for inclusion in a frame that is to be presented. In an implementation, the GPU 130 may scan the image buffer 134 to the display 112 in a fixed pattern (e.g., rasters). As used herein, scanning may refer to a process of updating pixels on the display 112. For example, the display 112 may be scanned from the top to the bottom starting at a video synchronization (V-SYNC) to update each pixel. The ink function 150 may include a predictor 152 that may estimate a time at which new digital pencil ink will be scanned to the display 112. For example, if the ink input is located at the top of the display 112, the digital pencil ink may be scanned shortly after the V-SYNC. In contrast, if the ink input is located at the bottom of the display 112, the digital pencil ink may not be scanned until closer to the end of a frame. The ink function 150 may be able to obtain additional ink input and draw the digital pencil ink to the image buffer 134 before the location of the digital pencil ink is scanned to the display 112. The predictor 152 may predict the time at which the new digital pencil ink will be scanned based on the most recent position of the digital pencil ink input and the velocity of the digital pen 120. The predictor 152 may use the predicted time to determine a safety margin for providing the drawing commands to the GPU 130 in order to complete drawing the digital pencil ink before the GPU 130 scans the location to the display 112.

The ink function 150 may also include a timing function 154 for waking up the ink function 150 to obtain the input. The timing function 154 may set a wake up time for each frame based on the V-SYNC and the predicted safety margin using a periodic monitored fence. The periodic monitored fence may provide a signal at a configured time before a hardware event such as the V-SYNC. The periodic monitored fence may be a synchronization object that allows a processor (e.g., CPU 114 or GPU 130) to signal or wait on a particular fence object. The synchronization object can wait on periodically occurring wait events, such as a time offset from various V-SYNCs. In an example, the timing function 154 may set the offset for a periodic monitored fence. The timing function 154 may adjust a periodic monitored fence based on the predicted safety margin such that the ink function 150 wakes up in time to obtain the input information and generate the commands for the GPU 130.

The computer device 110 may also include an application 160 including instructions stored in memory 116 and executed by the CPU 114. The application 160, for example, may be an application that uses digital pencil ink, for example, to take notes or create a drawing. A user may provide input to the application 160 using digital pencil ink. The application 160, for example, may perform character recognition to translate the digital pencil ink into text. It should be noted that the ink function 150 may bypass the application 160 for initially drawing the digital pencil ink. For example, the ink function 150 may obtain the ink input and generate commands for drawing the digital pencil ink before providing the ink input 158 to the application 160. The ink function 150 may also communicate with the application 160 to determine properties of the digital pencil ink such as a selected pencil having a line width and color.

Figure 3:
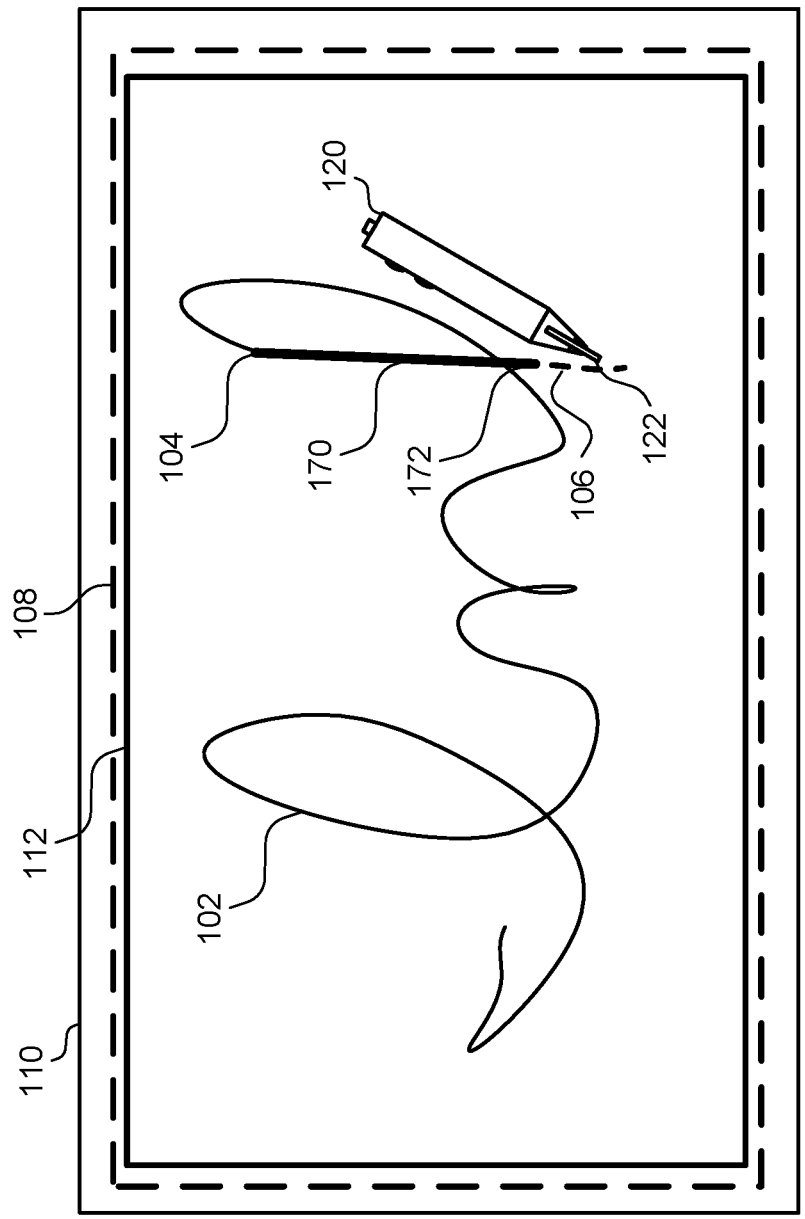
FIG. 3 is a diagram of drawing digital pencil ink on a display using a digital pen, in accordance with an implementation of the present disclosure.

Referring now to FIG. 3, the present disclosure may allow computer device 110 to draw digital pencil ink 102 on the display 112 in a manner that reduces the length of the segment 106 in comparison to FIG. 1. For example, FIG. 3 illustrates the word "Ink" being written on the display 112 in a continuous line using the same input as in FIG. 1. The end point 104 may still represent the last ink input that is available at the V-SYNC for rendering the frame via the graphics queue 135. However, the computer device 110 may obtain updated ink input including the point 172 after the V-SYNC. The computer device 110 may then draw the segment 170 using the priority queue 137 and/or the compute shader 138. Accordingly, the gap corresponding to the segment 106 may be reduced by drawing the segment 170. It should be appreciated that although FIG. 3 illustrates drawing the updated digital pencil ink with the segment 170 being a straight line for simplicity, more complex curves may also be drawn using the priority queue 137 and/or the compute shader 138.

Figure 4:
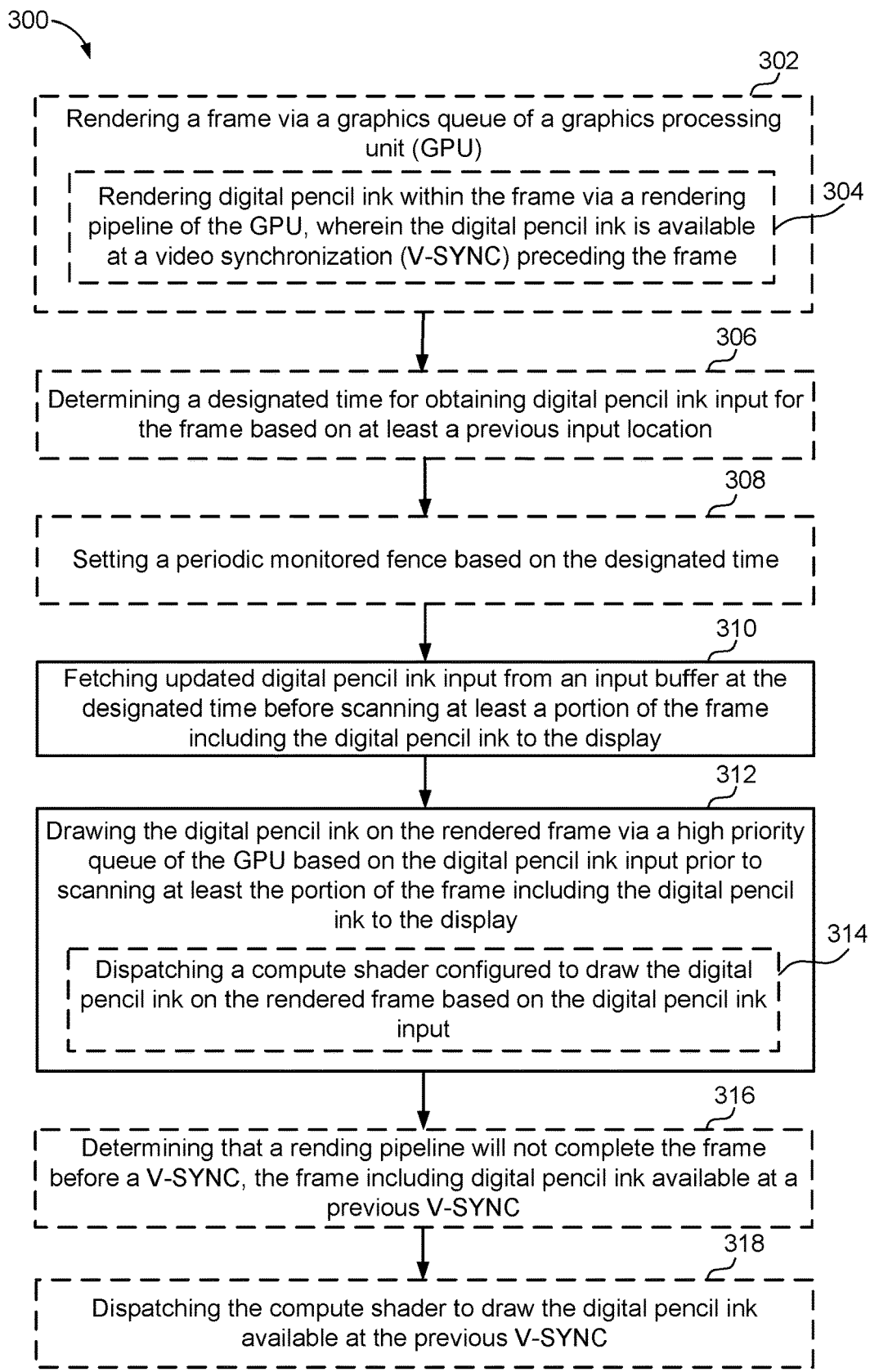
FIG. 4 is a flowchart of an example method of drawing digital pencil ink on a display, in accordance with an implementation of the present disclosure.

Referring now to FIG. 4, an example method 300 provides for the computer device 110 to display digital pencil ink on the display 112. For example, method 300 may be used for displaying digital pencil ink 102 as it is being drawn by the digital pen 120 such that the end point 104 is kept close to the pen tip 122. As a result, operation of method 300 may draw digital pencil ink 102 with less latency than current solutions. The actions illustrated in method 300 may overlap in time. For example, at an instant in time, two of the actions may be performed by different components. The execution of the actions may also be interleaved on a component. Additionally, the actions illustrated in method 300 may be performed in an order other than illustrated in FIG. 4. Further details and examples of timing are discussed below with respect to FIGS. 5-7.

At 302, method 300 may optionally include rendering a frame via a graphics queue of a graphics processing unit (GPU). For example, the display controller 142 may render a frame via the graphics queue 135 of the GPU 130. At 304, the action 302 may include rendering digital pencil ink within the frame via a rendering pipeline of the GPU, wherein the digital pencil ink is available at a video synchronization (V-SYNC) preceding the frame. For example, the display controller 142 may render digital pencil ink within the frame via the render pipeline 136 of the GPU 130. The digital pencil ink may be based on ink input that was available before a video synchronization preceding the frame (e.g., digital pencil ink 102 up to end point 104). That is, the digital pencil ink available at the V-SYNC preceding the frame may be processed through a normal frame rendering process via the graphics queue 135 and the render pipeline 136.

At 306, method 300 may optionally include determining a designated time for obtaining updated digital pencil ink input for the frame based on at least a previous input location. For example, the predictor 152 may determine the designated time for obtaining digital pencil ink input for the frame based on at least the previous input location. In an implementation, the predictor 152 may estimate a location of the digital pencil ink input based on the previous input location and an input velocity. The predictor 152 may estimate a time after a V-SYNC when the estimated location will be scanned. The predictor 152 may determine a safety margin before the estimated scanning time for drawing the digital pencil ink. The predictor 152 may set the designated time at or before the safety margin. The designated time may be either before or after the V-SYNC depend on the estimated location of the ink input. In an implementation, the predictor 152 may adjust the safety margin based on feedback regarding either the accuracy of the predictions or the time for the GPU to complete operations. For example, the predictor 152 may receive an indication of a time when the GPU 130 actually starts a drawing operation after being woken up and/or an indication of a time when the GPU 130 finishes rendering a frame or drawing ink using the compute shader 138.

At 308, the method 300 may optionally include setting a periodic monitored fence based on the designated time. For example, the timing function 154 may set the periodic monitored fence based on the designated time. The timing function 154 may set the time when the periodic monitored fence wakes up the ink function 150 for each frame.

At 310, the method 300 may include fetching updated digital pencil ink input from an input buff at the designated time before scanning at least a portion of the frame including the digital pencil ink to the display. For example, the ink function 150 may fetch the updated digital pencil ink input from the input buffer 156 at the designated time before displaying the frame. The obtained digital pencil ink input may include any updates to the position of the digital pen 120 at the designated time. For example, the updated digital pencil ink input may include input from after the V-SYNC for the corresponding frame. Accordingly, the obtained digital pencil ink input may include additional locations (e.g., point 172 and other points along segment 170) after a previous V-SYNC. In some implementations, the obtained digital pencil ink input may include additional locations input after the current V-SYNC but before a scanning operation reaches the input location. The digital pencil ink input may include input locations and input properties associated with each input location.

At 312, the method 300 may include drawing the updated digital pencil ink on the rendered frame via a priority queue of the GPU based on the updated digital pencil ink input prior to displaying at least a portion of the frame including the digital pencil ink. For example, the ink function 150 may draw the updated digital pencil ink (e.g., segment 170) on the rendered frame via the priority queue 137 of the GPU 130 based on the updated digital pencil ink input. The drawing may be performed before the GPU 130 scans at least a portion of the frame including the updated digital pencil ink (e.g., the portion of the frame including segment 170) to the display 112. For example, the compute shader 138 may draw the segment 170 on the rendered image in the image buffer 134 after the GPU starts scanning out the frame at the V-SYNC, but before the GPU 130 reaches the end point 104. Accordingly, when the GPU 130 reaches the end point 104, the GPU 130 may begin scanning out the segment 170 as if it had been rendered before the V-SYNC.

At 314, the action 312 may include dispatching a compute shader configured to draw the digital pencil ink on the rendered frame based on the digital pencil ink input. For example, the ink function 150 may dispatch the compute shader 138 (e.g., by sending commands to the priority queue 137) to draw the digital pencil ink on the rendered frame based on the updated digital pencil ink input. Further details and examples of using the compute shader 138 to draw digital pencil ink are discussed below regarding FIGS. 7-9.

At 316, the method 300 may optionally include determining that a rendering pipeline will not complete the frame before a V-SYNC, the frame including digital pencil ink based on input available at a previous V-SYNC. For example, the GPU 130 may indicate that the render pipeline 136 will not complete a frame before an upcoming V-SYNC. The GPU 130 may instead display the previous frame again. Accordingly, digital pencil ink input between the previous frame and the previous V-SYNC may not be rendered, resulting in a gap before the end point 104.

At 318, the method 300 may include dispatching compute shaders to draw the digital pencil ink 102 available at the previous V-SYNC. For example, the ink function 150 may dispatch the compute shader 138 via the priority queue 137 to draw the digital pencil ink 102 available at the previous V-SYNC. The ink function 150 may dispatch the compute shader 138 via the priority queue 137 in response to an indication that the render pipeline 136 will not complete a frame before the V-SYNC. Accordingly, the compute shader 138 may draw both the previously available digital pencil ink 102 and the updated digital pencil ink (e.g., segment 170) obtained after the V-SYNC. Drawing both sets of digital pencil ink with the compute shader 138 may result in a continuous line of digital pencil ink.

Figure 5:
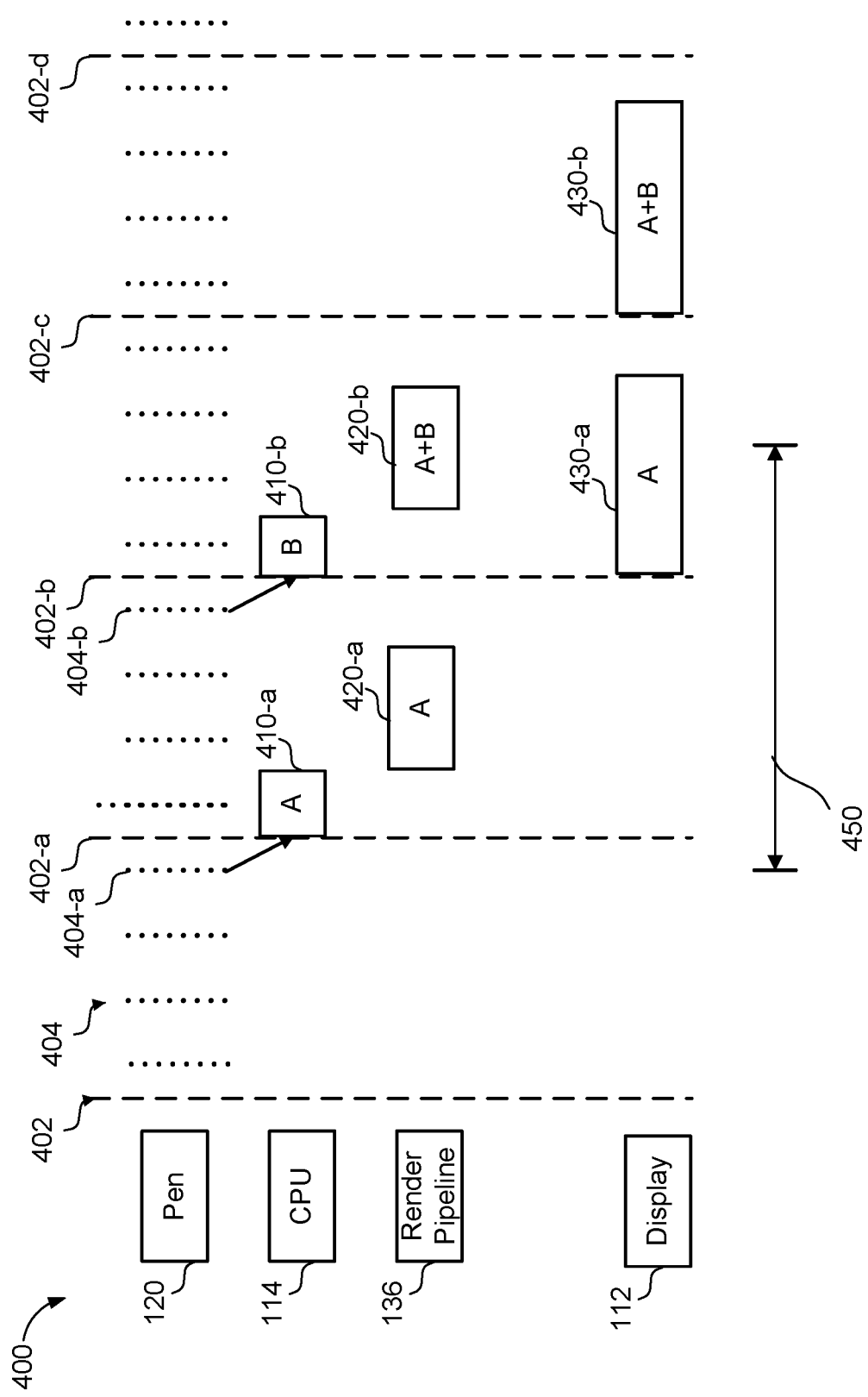
FIG. 5 is a timing diagram of rendering digital pencil ink on a display using a graphics queue.

Referring now to FIG. 5, an example timing diagram 400 illustrates rendering of frames and display of digital pencil ink using GPU 130, according to conventional techniques, where latency in presenting the digital pencil ink may occur due to relatively long queuing and processing times. The display 112 may have a periodic V-SYNC 402 (including 402-a, 402-b, etc.), which may correspond to the refresh rate of the display 112. For example, a refresh rate may be 30-90 Hz, resulting in a V-SYNC 402 every 11-33 milliseconds. The computer device 110 may also receive input updates 404 (e.g., updated position information) from digital pen 120. The input updates 404 may be more frequent than V-SYNC 402. For example, the input updates 404 may occur at a rate of 240 Hz.

In order to draw the digital pencil ink 102 on the display 112, the CPU 114 may obtain the input updates 404 and perform a command operation 410 to instruct the GPU 130 to render the digital pencil ink as part of a graphics frame. For example, at V-SYNC 402-a, the CPU 114 may obtain ink updates up to input update 404-a. The command operation 410 may include generating commands and sending commands to graphics queue 135 for execution by render pipeline 136. The commands may include commands for rendering the digital pencil ink as well as commands for rendering a display image (e.g., based on application 160 and compositor 144).

The render pipeline 136 may perform a rendering operation 420 to render the digital pencil ink along with the graphics frame. The rendering operation 420 may be a computationally intense operation. The time for completing the rendering operation 420 may depend on the quality of the rendered images being produced. For example, the rendering time may be based on factors such as resolution and number of colors, as well as quality of various visual effects (e.g., shadows or particles). The quality of the images may be adjusted based on hardware capability such that the GPU 130 is typically capable of rendering new frames at the refresh rate.

The GPU 130 and the display 112 may also perform a display operation 430 in which the GPU 130 scans the rendered image out to the display 112. For example, the GPU 130 may update the pixels of the display 112 line by line starting at the V-SYNC 402. The display operation 430 may extend over a substantial portion of the frame. For example, a frame A based on input at V-SYNC 402-a may begin scanning at V-SYNC 402-b, and may not be completed until V-SYNC 402-c. Accordingly, a portion (e.g., the bottom portion) of the frame may not be scanned until later in the frame. The time 450 between the input update 404-a and the V-SYNC 402-b may represent an average gap (e.g., for a pixel in the middle of the display 112) between the drawn digital pencil ink and the location of the pen tip 122. Generally, when the time of the ink update is fixed, portions of the frame that are scanned first will have a shorter time 450 than portions of the frame that are scanned last. The length of segment 106 may be proportional to the time 450.

In the subsequent frame, the digital pencil ink input may be obtained at input update 404-b. The digital pencil ink based on input update 404-a may be considered existing digital pencil ink. The rendering operation 420-b may include rendering both the existing digital pencil ink (A) and new digital pencil ink (B) as part of the next frame. Likewise, the display operation 430 may include scanning the rendered image including the existing digital pencil ink (A) and new digital pencil ink (B).

Figure 6:
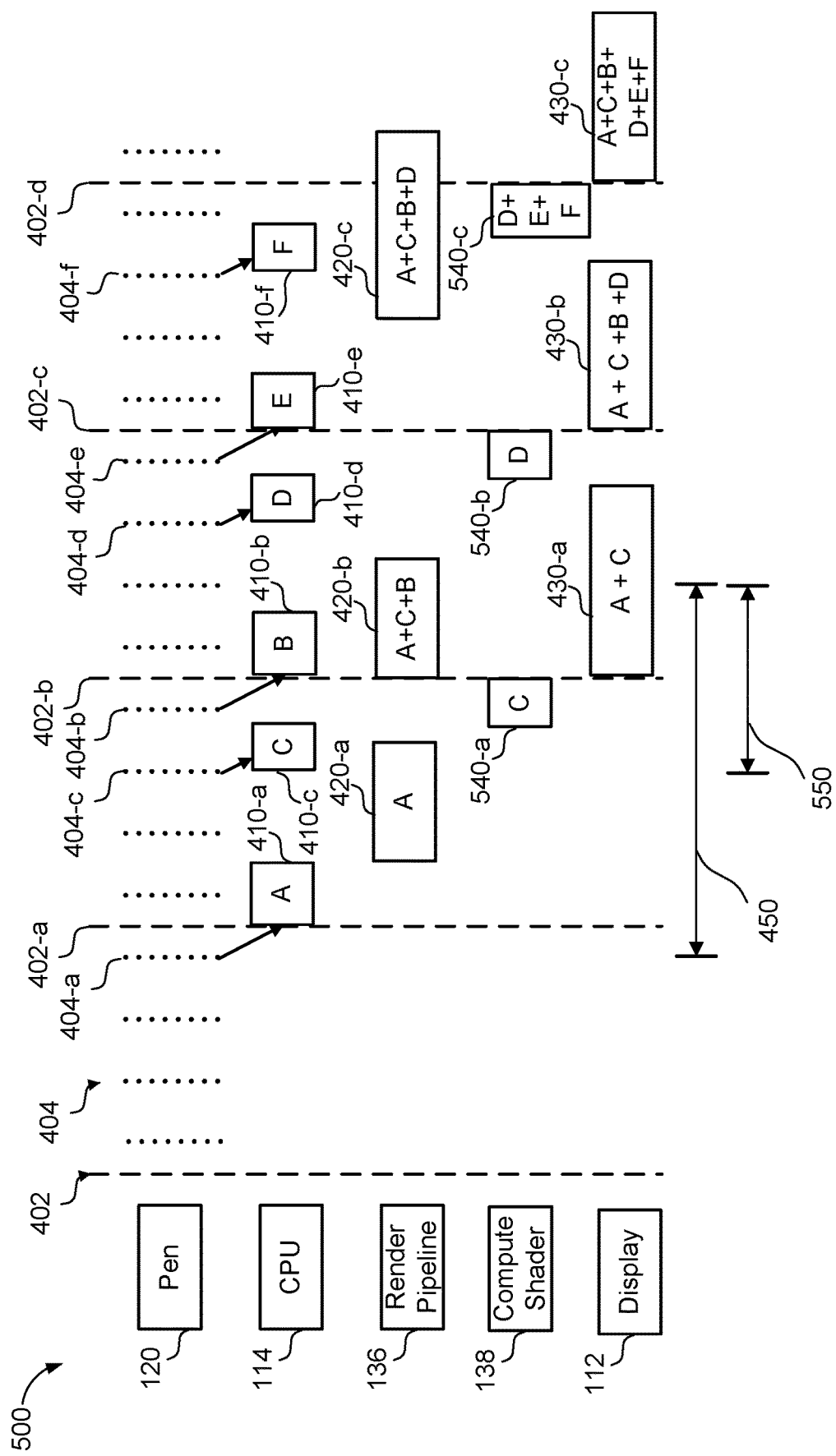
FIG. 6 is a timing diagram of drawing digital pencil ink using a priority queue in accordance with an implementation of the present disclosure.

Referring now to FIG. 6, according to the present disclosure, timing diagram 500 illustrates another example of rendering of frames and display of digital pencil ink using GPU 130, where latency in presenting digital pencil ink may be reduced by drawing digital pencil ink updates using a priority queue 137 and compute shader 138. The rate of V-SYNC 402 and input updates 404 may be the same as in FIG. 5. As in FIG. 5, the input update 404-a may be obtained by the CPU 114 at the V-SYNC 402-a, the CPU 114 may perform the command operation 410 and the render pipeline 136 may perform the rendering operation 420.

Additionally, in order to reduce latency, the CPU 114 may obtain ink input at input update 404-c and perform command operation 410-c to generate commands for compute shader 138 to draw digital pencil ink. The compute shader 138 may draw the additional digital pencil ink (C) that became available between input update 404-a and input update 404-c. For example, in draw operation 540-a, the compute shader 138 may adjust pixels of the rendered frame resulting from rendering operation 420-a. Accordingly, at the V-SYNC 402-b, the image buffer 134 may include digital pencil ink based on input until input update 404-c. The GPU 130 and display 112 may perform display operation 430-a to display the image including digital pencil ink up to C, that is A+C. As illustrated in FIG. 6, the time 550 between the last input update 404-c and the V-SYNC 402-b is significantly shorter than the time 450 of FIG. 5 (added to FIG. 6 for ease of comparison). Accordingly, the length of segment 106, e.g., the gap between the end of the ink and pen tip, may be reduced in comparison to the prior art process of FIG. 5.

In the subsequent frame beginning at V-SYNC 402-b, the CPU 114 may obtain ink input based on input update 404-b. Accordingly, the CPU 114 may perform the command operation 410-a to render the digital pencil ink A+C+B. At input update 404-d, the CPU 114 may obtain the new digital pencil ink input and perform command operation 410-d to draw the digital pencil ink using the priority queue 137 and the compute shader 138. The compute shader 138 may perform the draw operation 540-b to draw the digital pencil ink D. Accordingly, the display operation 430-b may include digital pencil ink A+C+B+D.

In a third frame, additional digital pencil ink input may be obtained at input update 404-e. Because the input update 404-e is available before the V-SYNC 402-c, the digital pencil ink may be queued for rendering via the render pipeline 136. However, the render pipeline may be started late or take a longer time to complete, for example, due to a higher priority process interrupting the rendering. The render pipeline 136 may generate a signal indicating that the rendering operation 420-c will not be completed by the V-SYNC 402-d. Traditionally, the GPU 130 would display the previously rendered frame. In this case, the previously rendered frame would not include the ink updates from 404-d or 404-e. Accordingly, in response to a signal that the render process will not complete the rendering operation 420-c before the V-SYNC 402-d, the priority queue 137 and/or compute shader 138 may be used to draw the updated digital pencil ink based on input updates 404-d and 404-e. Accordingly, the display operation 430-c may display all of the available digital pencil ink.

Figure 7:
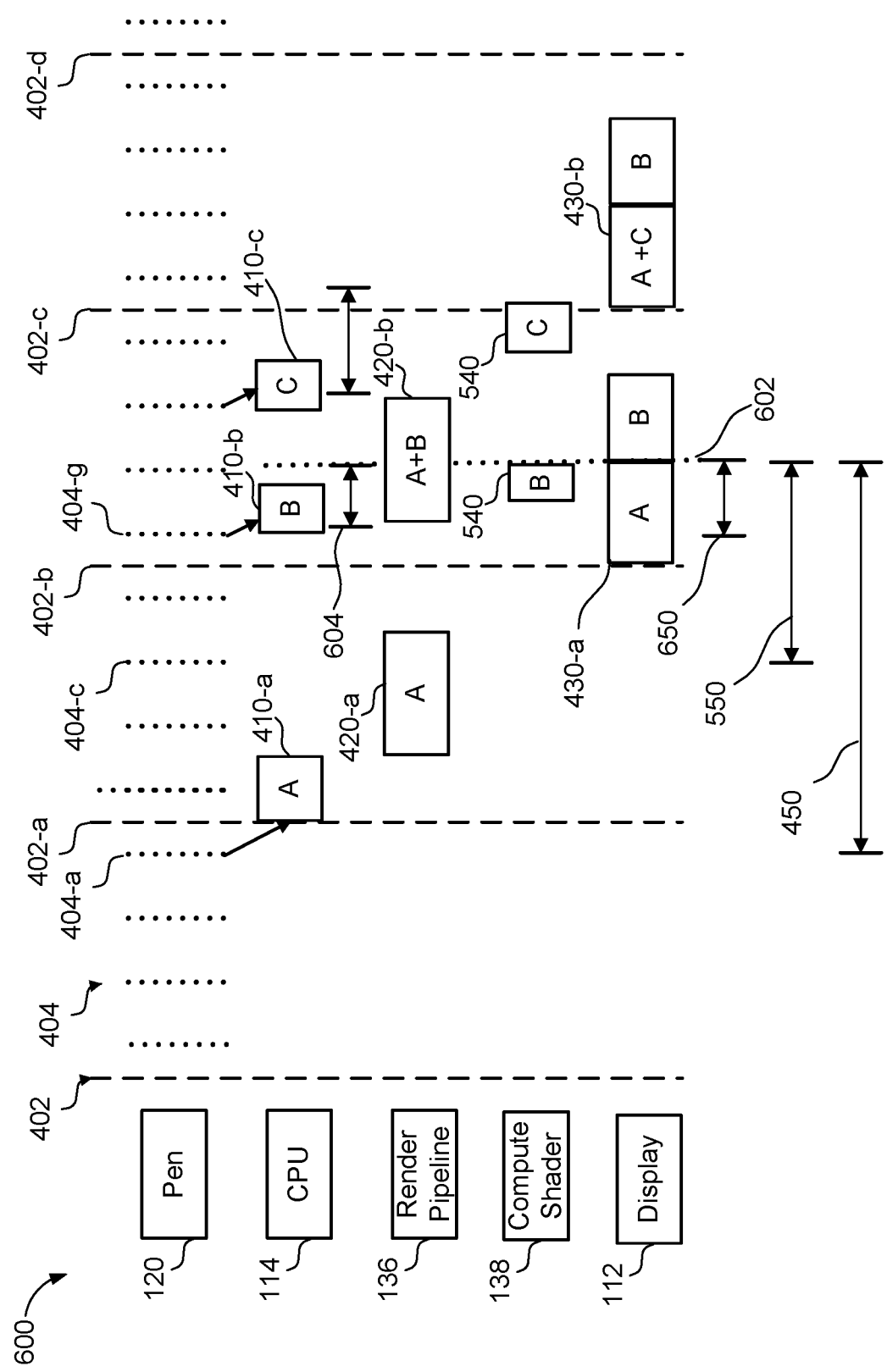
FIG. 7 is a timing diagram of drawing digital pencil ink using a priority queue and predicted timing, in accordance with an implementation of the present disclosure.

Referring now to FIG. 7, timing diagram 600 illustrates another example of rendering and display of digital pencil ink using the priority queue 137 and/or compute shader 138 of GPU 130, where further latency reductions in presenting digital pencil ink may be obtained based on a predicted time for scanning the digital pencil ink. The rate of V-SYNC 402 and input updates 404 may be the same as in FIG. 5.

Instead of obtaining an updated ink input at a fixed time before the V-SYNC 402, the CPU 114 (e.g., by executing predictor 152) may determine the time for obtaining the updated ink input. For example, the CPU 114 may determine, based on input update 404-a, that any additional ink input is likely to be located at the bottom of the display 112 and does not need to be scanned until time 602. The CPU 114 may also determine a safety margin 604 for performing a draw operation 540 for drawing any new ink. The CPU 114 may then obtain an input update 404 before the safety margin 604. In this example, the input update may be input update 404-g. In an implementation, if the predicted portion for the digital pencil ink is not scanned until near the end of the frame, the updated digital pencil ink may be obtained after the V-SYNC (e.g., V-SYNC 402-b), where the GPU 130 starts scanning the image to the display 112. Accordingly, digital pencil ink obtained at the input update 404-g, which according to FIG. 5 would not be rendered until after V-SYNC 402-d, may be drawn and scanned more than a full frame earlier according to the technique of FIG. 7. Therefore, the time 650 may be less than the time 450 in FIG. 5 (added to FIG. 7 for ease of comparison) and/or time 550 in FIG. 5 (added to FIG. 7 for ease of comparison). Additionally, it should be noted that times 450, 550, and 650 represent an average scenario (e.g., the digital pencil ink is near the middle). By predicting the display time of the digital pencil ink, the worst case scenario can be improved according to the technique illustrated in FIG. 7 such that the latency between the input from the digital pen 120 and drawing the digital pencil ink is consistently low (e.g., less than one frame).

Figure 8:
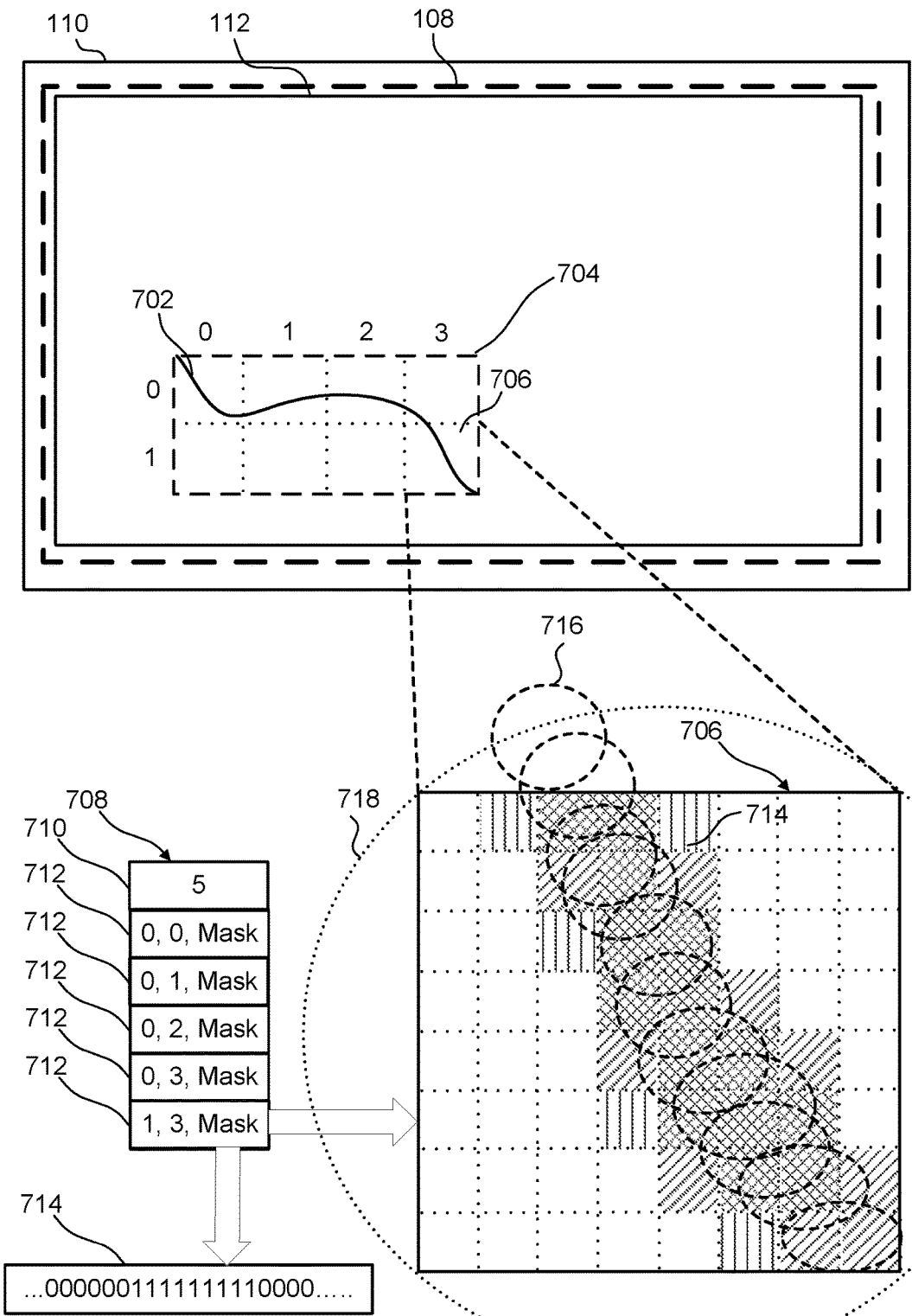
FIG. 8 is a schematic diagram of an example of rendering digital pencil ink on pixels of a display using a compute shader, in accordance with an implementation of the present disclosure.

Referring now to FIG. 8, an example of digital pencil ink drawn using the compute shader 138 is illustrated. The digitizer 108 may detect digital pencil ink input 702 in a portion of the display 112. The digital pencil ink input 702 may be interpreted as a set of stamps 716. For example, the CPU 114 and/or ink function 150 may generate a stamp for each input point (i.e., the location of the digital pen 120 when input is recorded). For digital pencil ink, each input point may be associated with input properties of the digital pen 120 such as pressure and tilt. Previously rendered digital pencil ink is omitted for simplicity. A bounding box 704 may be determined based on the maximum and minimum values of the updated digital pencil ink input. The bounding box may be expanded by a maximum radius of a stamp to ensure all stamps are within the bounding box. The bounding box 704 may be used to reduce the processing load on the GPU 130 and the compute shader 138. For example, the bounding box 704 may exclude all of the pixels outside of the bounding box 704 from being processed by the compute shader 138 regarding the updated digital pencil ink.

In order to quickly and efficiently render the updated digital pencil ink, the bounding box 704 may be segmented into a set of blocks 706. Each block 706 may include a number of pixels. For example, a block 706 may be an 8×8 block of pixels, although other sized blocks may be used. If the bounding box 704 is not evenly divisible into blocks, partial blocks may be padded outside of the bounding box 704 to generate full blocks.

In one implementation, the compute shader 138 may draw the digital pencil ink input 702 using three passes (although other implementations may use a different number of passes). In each pass, the CPU 114 may dispatch multiple compute shader threads to perform an operation on multiple instances of an input. A different input may be used in each pass. In a first pass, the compute shader 138 may determine stamp properties of each stamp 716 based on the digital pencil ink input and associated digital pen properties. For example, the digital pencil ink input may include coordinates of an output pixel where the digital pen 120 was located when the input point was sampled, a pressure on the digital pen 120 when the input point was sampled, and an angle of the pen when the input point was sampled. The CPU 114 may obtain the digital pencil ink input from the input buffer 156. The format of the digital pencil ink input may not be ideal for the GPU 130 to operate on. For example, the GPU 130 may need to convert the coordinates, pressure, and tilt into a description of an ellipse shaped stamp before determining whether the stamp affects an output pixel. The first pass of the compute shader may generate a thread for each digital pencil ink input point. Each thread may compute the stamp properties of the stamp 716. For example, the stamp properties of the stamp 716 may include a shape, size, and texture sample. The shape may be an ellipse based on the tilt. The size may be based on the pressure. The texture sample may be based on a selected type or size of pencil and the pressure. For example, the type or size of pencil may be based on conventional graphite pencils and may produce a line having similar properties to a line drawn with a corresponding graphite pencil. The thread for the first pass may also perform any computations that may be used by later passes. For example, the thread for the first pass may generate a pre-computed table of texture samples.

In a second pass, the compute shader 138 may determine which stamps 716 affect each block 706. That is, the compute shader 138 may determine whether block 706 is intersected by each stamp 716. The compute shader may dispatch a thread group for each block 706. Each thread group may include one thread for each stamp 716. Each individual thread may determine whether the respective block 706 is intersected by the respective stamp 716. In an implementation, determining the intersections may be simplified using a hit circle 718 to represent the block 706. If the center of the stamp 716 is within a distance of the center of the block 706 defined by the hit circle 718, the thread may determine an intersection.

The thread group may generate a bit mask 714. The bit mask 714 for the block 706 may indicate which input stamps 716 intersect the block 706. If the stamp 716 intersects the block 706, the stamp 716 may be added to a bit mask for the block 706 (e.g., a corresponding bit of the bit mask 714 may be set to 1). Blocks 706 that are not intersected by at least one stamp 716 of the digital pencil ink input 702 (e.g., bit mask equals 0) may be culled from the third pass. The second pass may fill an output buffer 708 with a number of intersected blocks 710 and an entry 712 for each intersected block including an identifier of the intersected block (or thread group identifier) and the bit mask 714 for the intersected block.

In a third pass, the compute shader 138 may color pixels. The compute shader 138 may be dispatched using a dispatch indirect command that allows the output buffer 708 to provide input to determine the number of thread groups. For example, in the third pass, the compute shader 138 may spawn a thread group for each intersected block included in an entry 712 based on the number of intersected blocks 710. Using the dispatch indirect command may avoid latency in transferring information (e.g., the number of blocks) from the GPU 130 to the CPU 114 to dispatch the compute shader 138. In the third pass, each thread in the group may correspond to a pixel of an intersected block 706. For example, the thread group may include 64 threads for an 8×8 block. Each thread may determine, for each stamp 716 identified by the bit mask 714, an effect of the respective stamp 716 on the individual pixel. For example, the thread may determine to apply the texture sample to the pixel. The thread for the pixel may determine the cumulative effect of all of the intersecting stamps 716 on the pixel. For example, as illustrated in FIG. 8, some of the pixels intersect a single stamp 716, while other pixels intersect multiple stamps. Each stamp may contribute to the shading of the pixel. Accordingly, a pixel intersected by multiple stamps may have a more intense effect applied. In other words, a weight applied to the pixel may be greater as more stamps contribute to the cumulative effect. In an implementation, the effect may be applied to current values in a representation of the pixel. Source over blending may be used to blend the current values with the cumulative effect. For example, the cumulative effect on a white pixel may be more dramatic than the effect on a dark pixel.

Figure 9:
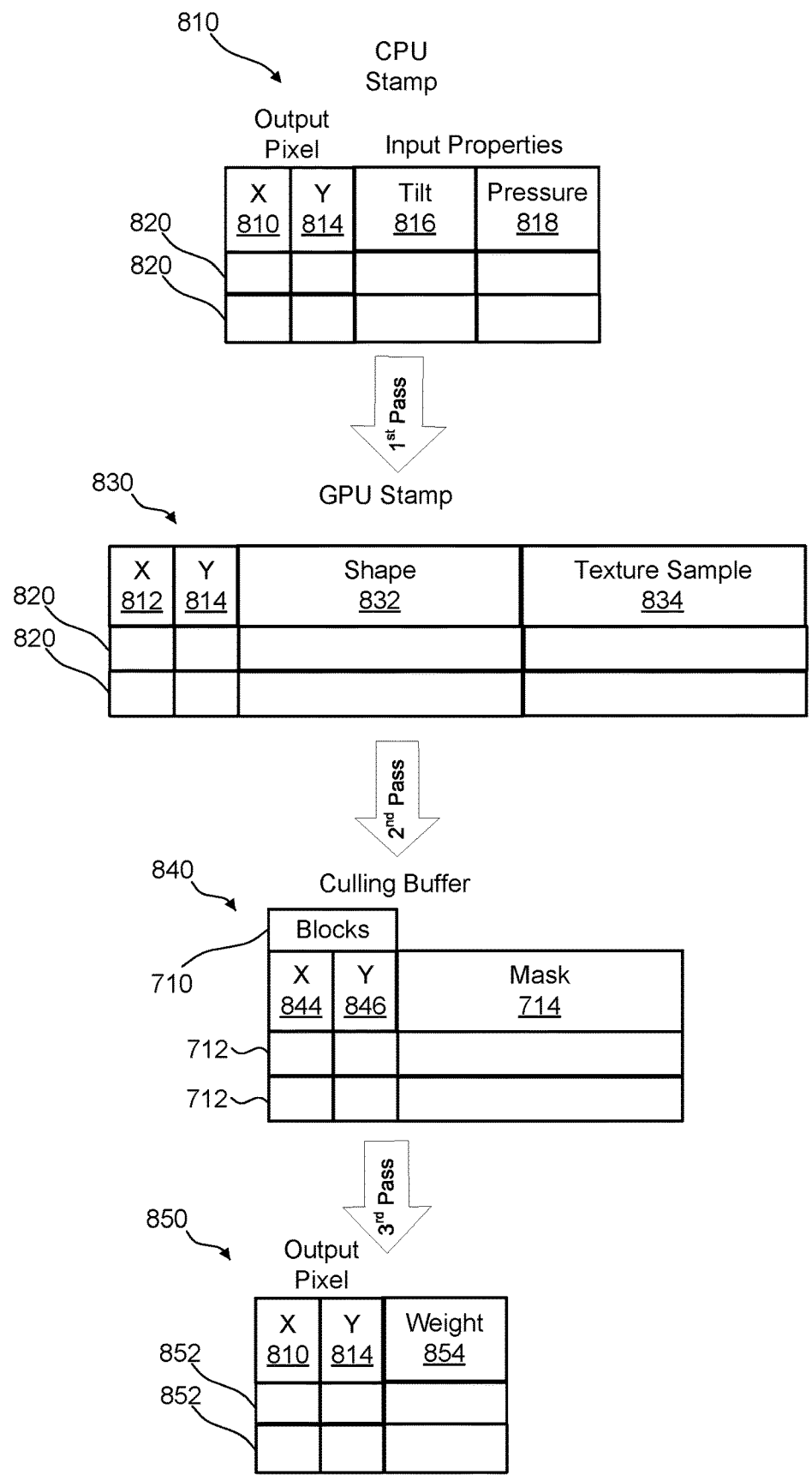
FIG. 9 is a schematic diagram of an example of data structures used with a compute shader for pencil ink rendering, in accordance with an implementation of the present disclosure.

FIG. 9 shows various data structures that may be used to process the updated digital pencil ink. A data structure 810 may be stored in the input buffer 156 for digital pencil ink input. The data structure 810 may include coordinates including an x-coordinate 812 and a y-coordinate 814. The data structure 810 may also include input properties such as tilt 816 and pressure 818 associated with each input point 820.

The data structure 830 may be generated by the compute shader 138 in the first pass and stored in the memory 132 to store GPU stamps. The data structure 830 may include coordinates including an x-coordinate 812 and a y-coordinate 814. The data structure 830 may also include stamp properties such as shape 832 and texture sample 834 associated with each input point 820.

The data structure 840 may be generated by the compute shader 138 in the second pass and stored in the memory 132 to store the output buffer 708. The data structure 840 may include a number of intersected blocks 710. The data structure 840 may also include block coordinates including an x-coordinate 844 and a y-coordinate 846. The block coordinates may refer to the coordinates of a block 706 rather than a pixel. The data structure 840 may include the mask 714 associated with each entry 712.

The data structure 850 may be generated by the compute shader 138 in the third pass. The data structure 850 may include coordinates including an x-coordinate 812 and a y-coordinate 814 of each output pixel 852. The data structure 850 may also include a total weighted value 854 to be applied to the output pixel.

Figure 10:
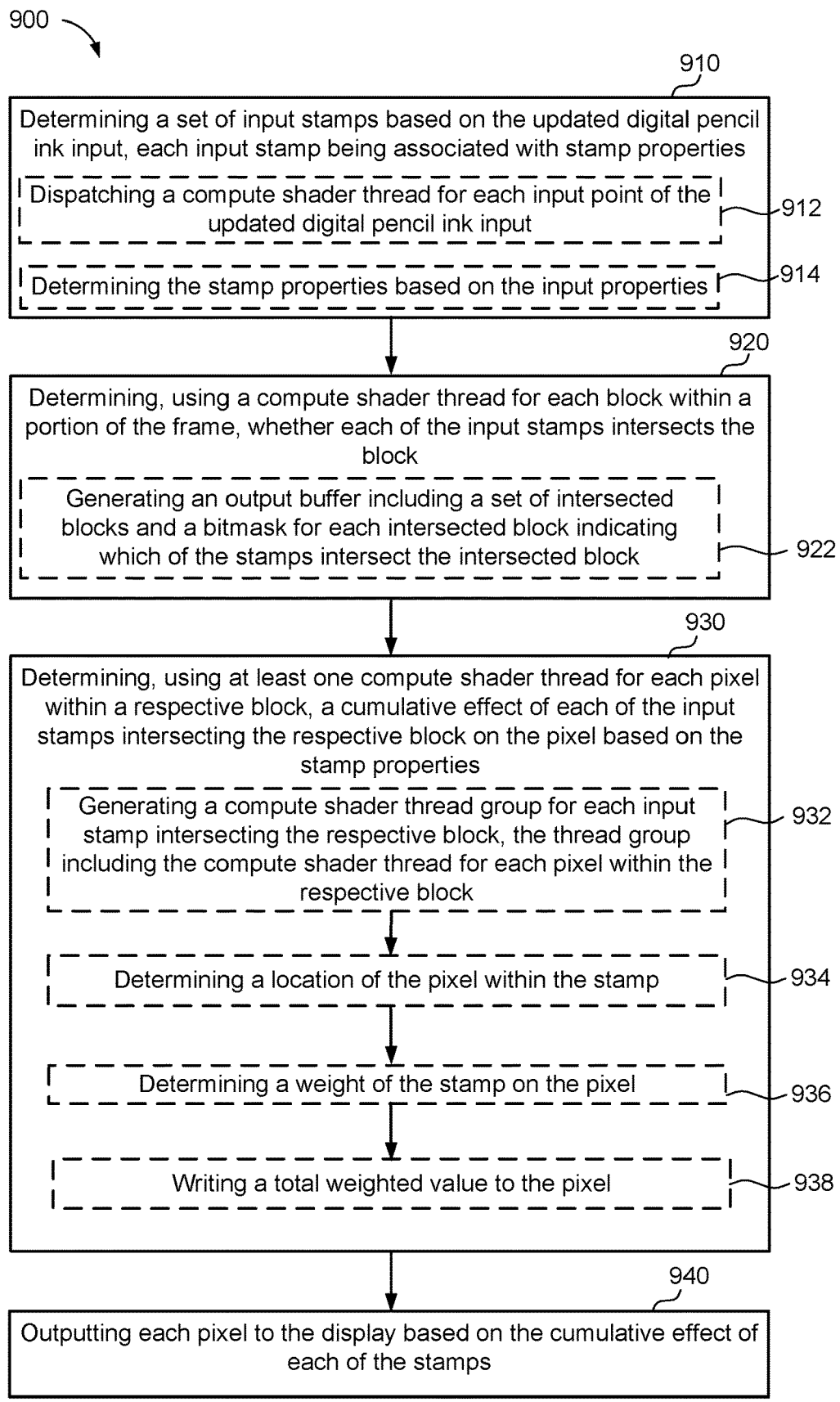
FIG. 10 is flowchart of an example method of rendering digital pencil ink using a compute shader, in accordance with an implementation of the present disclosure.

Referring now to FIG. 10, an example method 900 provides for the compute shader 138 to draw digital pencil ink on the display 112. For example, method 900 may be used for displaying digital pencil ink 102 as it is being drawn by the digital pen 120 such that the end point 104 is kept close to the pen tip 122.

At 910, the method 900 may include determining a set of input stamps based on the updated digital pencil ink input, each input stamp being associated with stamp properties. For example, the ink function 150 may determine the set of input stamps 916 based on the updated digital pencil ink input, each input stamp being associated with stamp properties such as shape 832 and texture sample 834. In an implementation, for instance, action 910 may optionally include, at 912, dispatching a compute shader thread for each input point of the updated digital pencil ink input. For example, the ink function (executed by the CPU) may call the compute shader 138 of the GPU 130 to dispatch a compute shader thread for each input point of the digital pencil ink input. In an implementation, for instance, action 910 may optionally include, at 914, determining the stamp properties based on the input properties. For example, each thread may determine the stamp properties (e.g., shape 832 and texture sample 834) based on the input properties (e.g., tilt 816 and pressure 818).

At 920, the method 900 may include determining, using a compute shader thread for each block within a portion of the frame, whether each of the input stamps intersects the block. For example, the compute shader 138 may spawn a thread group for each block 906. Each thread within the thread group may correspond to a stamp 916. Each thread may determine whether the stamp 916 will intersect the respective block 906. At 922, the action 920 may optionally include generating an output buffer including a set of intersected blocks and bitmask for each intersected block indicating which of the stamps intersect the intersected block. For example, the compute shader 138 may generate the output buffer 708 including a number of intersected blocks 710 and entries 712 for each of the set of intersected blocks. In an implementation, the output buffer 708 may only include blocks intersected by a stamp. In another implementation, the action 920 may optionally include culling blocks that are not intersected by at least one stamp. For example, the compute shader 138 may cull blocks that are not intersected by at least one stamp from the output buffer 708. Culling blocks may reduce the work of the compute shader in a third pass.

At 930, the method 900 may include determining, using at least one compute shader thread for each pixel within a respective block, a cumulative effect of each of the input stamps intersecting the respective block on the pixel based on the stamp properties. For example, the compute shader 138 may spawn a thread group for each block 706 included in the output buffer 708. Each thread group may include a thread for each pixel within the block (e.g., 64 threads for the block 706). Each thread may loop through the stamps intersecting the block 706 to determine a weight to apply to the pixel. For example, action 930 may optionally include, at 932, generating a compute shader thread group for each input stamp intersecting the respective block, the thread group including the compute shader thread for each pixel within the respective block. For instance, the compute shader 138 may generate the compute shader thread groups based on the mask 714 for the respective block indicating which stamps 716 intersect the block 706.

Each compute shader thread may determine a weight of each stamp 716 and a total weighted value 854 for all of the stamps 716. For example, at 934, the action 930 may optionally include determining a location of the pixel within the stamp. For example, the compute shader thread may look up the stamp in the data structure 830 and determine the location of the pixel within the stamp based on the x-coordinate 812, y-coordinate 814, and shape 832. At 936, the action 930 may optionally include determining a weight of the stamp on the pixel. For example, the compute shader 138 may use the location determined at action 934 and the texture sample 834 to determine the weight of the stamp on the pixel. The actions 934 and 935 may be repeated for each pixel within the block 706. At 938, the action 930 may optionally include writing a total weighted value to the pixel. The compute shader 138 may sum the weight of each of the stamps and blend the total weight with a current value of the pixel to determine the total weighted value for the pixel. The compute shader 138 may write the total weighted value 854 to the data structure 850.

At 940, the method 900 may include outputting each pixel to the display based on the cumulative effect of each of the stamps. For example, the GPU 130 may output each pixel to the display 112 based on the cumulative effect of each of the stamps. In an implementation, the GPU 130 may scan out the image buffer 134 at the V-SYNC after applying the respective total weighted value 854 to each pixel in the image buffer 134. Accordingly, the display 112 may include the segment 170 representing the updated digital pencil ink rendered as digital pencil ink.

Figure 11:
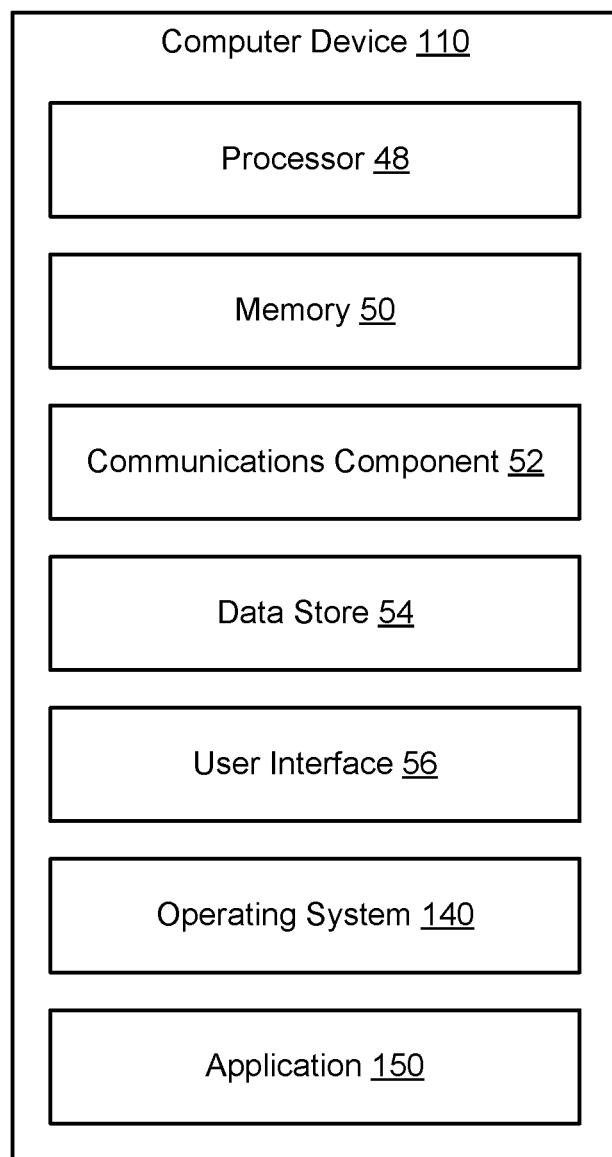
FIG. 11 is a schematic block diagram of an example computer device in accordance with an implementation of the present disclosure.

Referring now to FIG. 11, illustrated is an example computer device 110 in accordance with an implementation, including additional component details as compared to FIG. 2. In one example, computer device 110 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include CPU 114 and/or GPU 130. In an example, computer device 110 may include memory 50 for storing instructions executable by the processor 48 for carrying out the functions described herein. In an implementation, for example, memory 50 may include memory 116 and/or memory 132.

Further, computer device 110 may include a communications component 52 that provides for establishing and maintaining communications with one or more parties utilizing hardware, software, and services as described herein. Communications component 52 may carry communications between components on computer device 110, as well as between computer device 110 and external devices, such as devices located across a communications network and/or devices serially or locally connected to computer device 110. For example, communications component 52 may include one or more buses, and may further include transmit chain components and receive chain components associated with a transmitter and receiver, respectively, operable for interfacing with external devices. In an implementation, for example, communications component 52 may include connection 124 for communicatively connecting digital pen 120 to CPU 114 and memory 116.

Additionally, computer device 110 may include a data store 54, which can be any suitable combination of hardware and/or software, that provides for mass storage of information, databases, and programs employed in connection with implementations described herein. For example, data store 54 may be a data repository for operating system 140 (FIG. 2) and/or applications 160 (FIG. 2).

Computer device 110 may also include a user interface component 56 operable to receive inputs from a user of computer device 110 and further operable to generate outputs for presentation to the user. User interface component 56 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 may include one or more output devices, including but not limited to a display (e.g., display 112), a speaker, a haptic feedback mechanism, a printer, any other mechanism capable of presenting an output to a user, or any combination thereof.

In an implementation, user interface component 56 may transmit and/or receive messages corresponding to the operation of operating system 140 and/or application 160. In addition, processor 48 executes operating system 140 and/or application 160, and memory 50 or data store 54 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method of drawing digital pencil ink on a display for input received after rendering a frame via a graphics queue of a graphics processing unit (GPU), comprising:
    fetching updated digital pencil ink input from an input buffer at a designated time before scanning at least a portion of the frame including the digital pencil ink to the display, the updated digital pencil ink input including input locations and input properties associated with each input location;
    determining a set of input stamps based on the updated digital pencil ink input, each input stamp being associated with stamp properties;
    determining, using a compute shader thread for each of a plurality of equal sized blocks segmenting the portion of the frame, whether each of the input stamps intersects the respective block, each block including a plurality of pixels within the portion of the frame;
    determining, using at least one compute shader thread for each pixel of a respective block that is intersected by at least one of the input stamps, a cumulative effect of at least two of the input stamps intersecting the respective block on the pixel based on the stamp properties of each of the at least two input stamps; and
    outputting each pixel to the display based on the cumulative effect of the at least two input stamps.

2. The method of claim 1, wherein determining the set of input stamps comprises dispatching a compute shader thread for each input point of the updated digital pencil ink input.

3. The method of claim 2, wherein the input properties include at least one of a tilt or pressure and the stamp properties include at least one of a stamp shape or a texture sample, and wherein each first compute shader thread determines the stamp properties based on the input properties.

4. The method of claim 1, wherein determining whether each of the input stamps intersects the block comprises generating a bit mask indicating which input stamps intersect the block.

5. The method of claim 1, wherein determining whether each of the input stamps intersects the block comprises determining whether a center of the input stamp is within a distance of a center of the block.

6. The method of claim 1, wherein determining the cumulative effect of the at least two input stamps intersecting the respective block on the pixel comprises generating a compute shader thread group for each input stamp intersecting the respective block, the thread group including the compute shader thread for each pixel within the respective block.

7. The method of claim 1, wherein determining the cumulative effect of the at least two input stamps intersecting the respective block on the pixel comprises:
    determining a location of the pixel within the stamp;
    determining a weight of the stamp on the pixel; and
    writing a total weighted value to the pixel.

8. A computer device for drawing digital pencil ink, comprising:
    a memory storing one or more parameters or instructions for executing an operating system and one or more applications;
    a graphics processing unit (GPU) for rendering frames of the one or more applications for display on a display device coupled to the computer device, the GPU including a graphics queue that renders a frame and a priority queue that executes compute shaders; and
    at least one processor coupled to the memory, and the GPU, wherein the at least one processor is configured to:
    fetch updated digital pencil ink input from an input buffer at a designated time before scanning at least a portion of the frame including the digital pencil ink to the display, the updated digital pencil ink input including input locations and input properties associated with each input location;
    determine a set of input stamps based on the updated digital pencil ink input, each input stamp being associated with stamp properties;
    determine, using a compute shader thread for each of a plurality of equal sized blocks segmenting the portion of the frame, whether each of the input stamps intersects the respective block, each block including a plurality of pixels within the portion of the frame; and
    determine, using at least one compute shader thread for each pixel of a respective block that is intersected by at least one of the input stamps, a cumulative effect of at least two of the input stamps intersecting the respective block on the pixel based on the stamp properties of each of the at least two input stamps,
    wherein the GPU is configured to output each pixel to the display based on the cumulative effect of the at least two input stamps.

9. The computer device of claim 8, wherein the processor is configured to determine the set of input stamps by dispatching a first compute shader thread for each input point of the updated digital pencil ink input.

10. The computer device of claim 9, wherein the input properties include at least one of a tilt or pressure and the stamp properties include at least one of a stamp shape or a texture sample, and wherein each first compute shader thread determines the stamp properties based on the input properties.

11. The computer device of claim 8, wherein the compute shader thread for each block is configured to generate a bit mask indicating which input stamps intersect the block.

12. The computer device of claim 8, wherein the compute shader thread for each block is configured to determine whether each of the input stamps intersects the block based on whether a center of the input stamp is within a distance of a center of the block.

13. The computer device of claim 8, wherein the processor is configured to dispatch a compute shader thread group for each input stamp intersecting the respective block, the thread group including the compute shader thread for each pixel within the respective block.

14. The computer device of claim 8, wherein the at least one compute shader thread is configured to:
    determine a location of the pixel within the stamp;
    determine a weight of the stamp on the pixel; and
    write a total weighted value to the pixel.

15. A non-transitory computer-readable medium, comprising code executable by one or more processors for drawing digital pencil ink on a display for input received after rendering a frame via a graphics queue of a graphics processing unit (GPU) in a computer device, the code comprising code for:

fetching updated digital pencil ink input from an input buffer at a designated time before scanning at least a portion of the frame including the digital pencil ink to the display, the updated digital pencil ink input including input locations and input properties associated with each input location;

dispatching a first compute shader thread for each input location of the updated digital pencil ink input to determine a set of input stamps based on the updated digital pencil ink input, each input stamp being associated with stamp properties;

dispatching a second compute shader thread group for each of a plurality of equal sized blocks segmenting the portion of the frame to determine whether each of the input stamps intersects the respective block, each thread group including a thread for each input stamp, each block including a plurality of pixels within the portion of the frame;

dispatching at least one third compute shader thread for each pixel of a respective block that is intersected by at least one of the input stamps to determine a cumulative effect of at least two of the input stamps intersecting the respective intersecting block on the pixel based on the stamp properties of each of the at least two input stamps; and outputting each pixel to the display based on the cumulative effect of the at least two input stamps.

16. The non-transitory computer-readable medium of claim 15, wherein the input properties include at least one of a tilt or pressure and the stamp properties include at least one of a stamp shape or a texture sample, and wherein each first compute shader thread determines the stamp properties based on the input properties.

17. The non-transitory computer-readable medium of claim 15, wherein the second compute shader thread group generates a bit mask indicating which input stamps intersect the block.

18. The non-transitory computer-readable medium of claim 15, wherein the code for each thread of the second compute shader thread group comprises code for determining whether a center of the input stamp is within a distance of a center of the block.

19. The non-transitory computer-readable medium of claim 15, wherein the code for dispatching the at least one third compute shader thread comprises code for dispatching a third compute shader thread group for each input stamp intersecting the respective block, the third compute shader thread group including the third compute shader thread for each pixel within the respective block.

20. The non-transitory computer-readable medium of claim 15, wherein the code for the third compute shader thread comprises code for:

determining a location of the pixel within the stamp;
determining a weight of the stamp on the pixel; and
writing a total weighted value to the pixel.

* * * * *